May 3, 1966      R. E. BOWLES      3,249,302
VISUAL READOUT DEVICE

Filed Jan. 21, 1963      8 Sheets-Sheet 1

INVENTOR
ROMALD E. BOWLES
BY Hurvitz + Rose
ATTORNEYS

May 3, 1966  R. E. BOWLES  3,249,302
VISUAL READOUT DEVICE
Filed Jan. 21, 1963  8 Sheets-Sheet 2

INVENTOR
ROMALD E. BOWLES
BY *Hurvitz & Rose*
ATTORNEYS

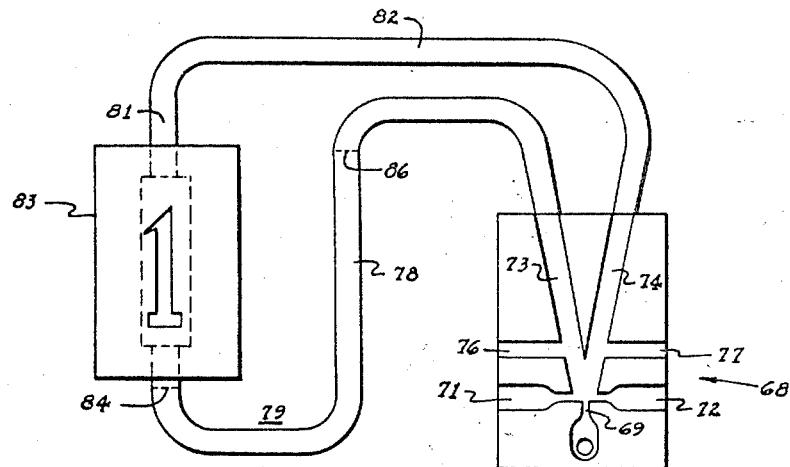
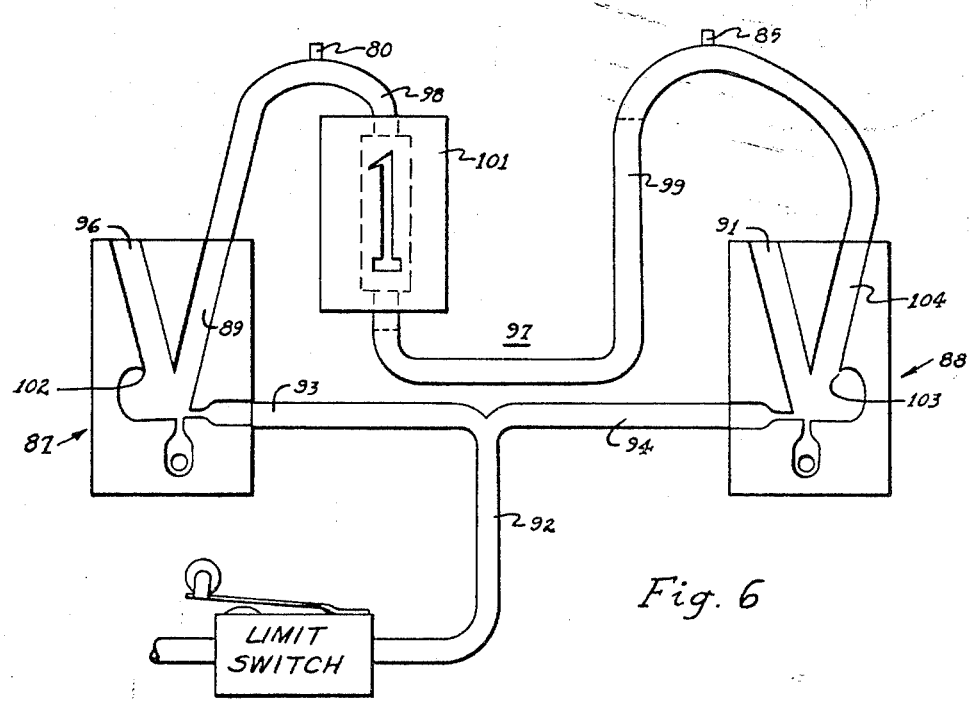

May 3, 1966  R. E. BOWLES  3,249,302
VISUAL READOUT DEVICE

Filed Jan. 21, 1963  8 Sheets-Sheet 4

INVENTOR.
ROMALD E. BOWLES
BY *Hurvitz & Rose*

May 3, 1966 R. E. BOWLES 3,249,302
VISUAL READOUT DEVICE
Filed Jan. 21, 1963 8 Sheets-Sheet 5

INVENTOR.
ROMALD E. BOWLES
BY
Hurvitz + Rose

May 3, 1966  R. E. BOWLES  3,249,302
VISUAL READOUT DEVICE

Filed Jan. 21, 1963  8 Sheets-Sheet 6

INVENTOR.
ROMALD E. BOWLES
BY
Hurvitz + Rose

May 3, 1966 R. E. BOWLES 3,249,302
VISUAL READOUT DEVICE
Filed Jan. 21, 1963 8 Sheets-Sheet 7

INVENTOR.
ROMALD E. BOWLES
BY
Hurvitz + Rose

May 3, 1966 — R. E. BOWLES — 3,249,302
VISUAL READOUT DEVICE
Filed Jan. 21, 1963 — 8 Sheets-Sheet 8
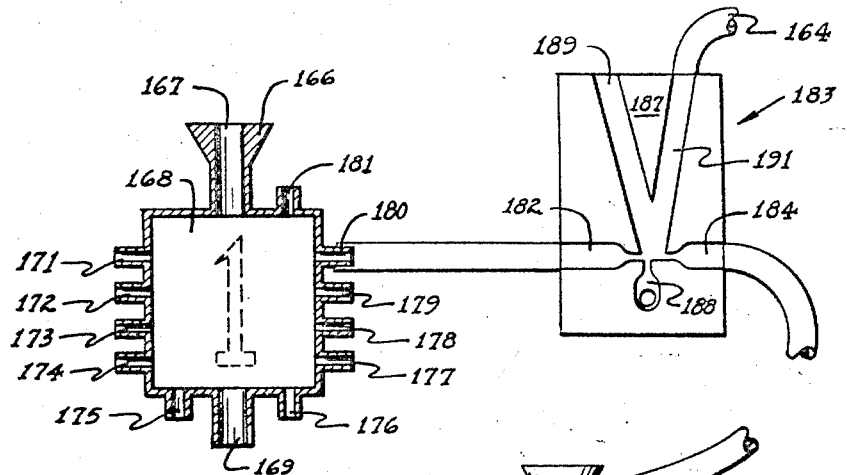
Fig. 16
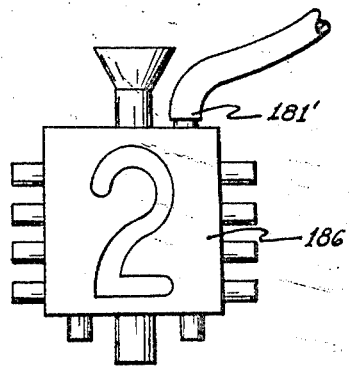
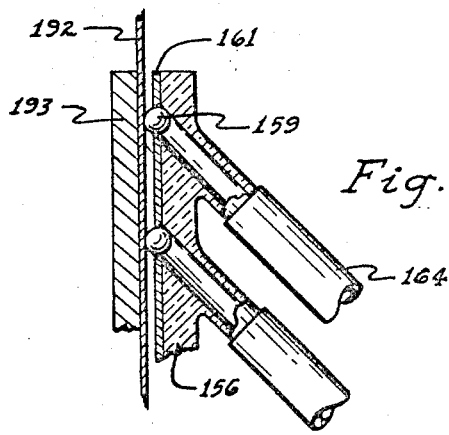
Fig. 17
INVENTOR.
ROMALD E. BOWLES
BY Hurvitz & Rose United States Patent Office 3,249,302
Patented May 3, 1966

3,249,302
VISUAL READOUT DEVICE
Romald E. Bowles, 12712 Meadowood Drive,
Silver Spring, Md.
Filed Jan. 21, 1963, Ser. No. 252,788
8 Claims. (Cl. 235—201)

The present invention relates to visual display devices and more particularly to the display devices for providing a visual display of information stored in pure fluid amplifiers and systems.

The term "pure fluid amplifier" or "pure fluid system" as used herein refers to a recent development in fluid systems in which amplification of one or more of the parameters of a flowing stream may be effected in apparatus employing no moving parts. A typical example of such a device is an apparatus having fluid supplied to a power nozzle which issues a stream of fluid towards the apex of a divider located downstream from the nozzle. Control nozzles are disposed on opposite sides of the stream closely adjacent to the power nozzle and, upon the issuance of fluid streams from the control nozzles, the main stream is deflected from its center position causing more (or all) of the fluid to flow to a first receiving aperture located along one side of the divider than to a second receiving aperture located along the other side thereof. The energy, pressure or mass flow supplied to the control nozzle is less than the change in the corresponding parameter along the side of the divider to which the main stream is deflected. In consequence, the apparatus provides a gain of the output signal over the input signal and may be termed an amplifier.

In order to provide significant amplification in such a system, the region of interaction between the main stream and the control stream or streams is normally confined between top and bottom plates or walls so the main stream is confined at least in the region of interaction to its plane of deflection. In consequence, the main stream appears as a deflectable divider passing through the interaction region and, when the control stream impinges thereupon, it cannot flow around or through the main stream and must therefore deflect the main stream in a direction depending upon the direction of the control stream.

In the above discussion, it has been assumed that the control signal is in the form of a stream which is directed toward the main stream and, due to momentum interchange between the two streams, produced deflections of the main stream. It is to be understood, however, that since the power or main stream constitutes a deflectable barrier between two regions on opposite sides thereof, pressure differentials may be established on opposite sides of the main stream to produce deflection. Combinations of stream interaction and pressure differentials may also be employed to deflect the main stream. Amplifiers of the types described above may function in numerous ways and for a more detailed description of the various forms which such elements may take, reference is made to Patent No. 3,001,698 for Fluid Pulse Converter by Raymond W. Warren issued September 26, 1961 and French Patent No. 1,278,782 by Romald E. Bowles and Raymond W. Warren for Multistable Fluid Amplifier.

Briefly summarizing the various types of operations which may be realized by the apparatus described above, they are capable of operation as analog amplifiers pre se, amplifiers with positive or negative feedback, as bi-stable devices, as memory units, logical gating elements and oscillators. The individual units may be incorporated in systems for approximating many of the functions now performed substantially only by electronic circuits. Analog amplifiers may be cascaded to provide high gain units or may employ varying amounts of feedback to provide high stability and low noise or high gain, or many employ various passive elements in feedback loops to provide narrow band or wide band amplifiers. The bi-stable elements on the other hand may be combined with fluid logic elements to provide pulse counters or shift registers and logical gating and other logical control circuitry.

Various types of output devices may be utilized with pure fluid amplifiers and one may employ hot wire anemometers, pressure transducers, variable di-electric capacitors, etc. to provide direct electrical readout from the apparatus. Further, mechanical devices such as slide valves, diaphragm-operated elements, etc. may be employed to provide mechanical readout from the apparatus. However, none of the above types of readout devices provide for an inexpensive visual readout display which employs no moving members for controlling the display elements.

It is an object of the present invention to provide visual readout devices for utilization with pure fluid amplifiers and systems and, more particularly to visual readout devices which may be driven directly from a pure fluid element so that the display elements are controlled by direct impingement of the fluid amplifier output flows thereupon.

It is another object of the present invention to provide apparatus for effecting direct visual readout from pure fluid elements which readout apparatus provides character, such as numerical or alphabetical, displays.

A specific object of the present invention is to provide a device for pure fluid systems employing only moving fluids in the readout apparatus.

Another specific object of the present invention is to provide a readout apparatus for pure fluid systems which apparatus employs small moving balls to provide a direct character display.

Still another object of the present invention is to provide a readout mechanism for pure fluid systems which mechanism employs moving liquids and the like to provide character display.

It is a broad, general object of the present invention to provide a readout mechanism for pure fluid systems in which the display system utilizes moving materials which may respond quite rapidly to the presentation of information thereto which information is presented in the form of moving streams of fluid.

The above and still further objects, features and advantages of the present invention will become apparent upon consideration of the following detailed description of several specific embodiments thereof, especially when taken in conjunction with the accompanying drawings, wherein:

FIGURE 5 is still another embodiment of the present invention employing a further type of fluid element for control purposes and illustrating another type of display apparatus associated therewith;

FIGURE 6 is a schematic diagram of another display arrangement employing still another type of fluid element;

FIGURE 16 is a schematic diagram of an apparatus for controlling numerical displays by means of the apparatus illustrated in FIGURES 14 and 15; and FIGURE 17 is a schematic diagram of an apparatus for printing.

Figure 1:
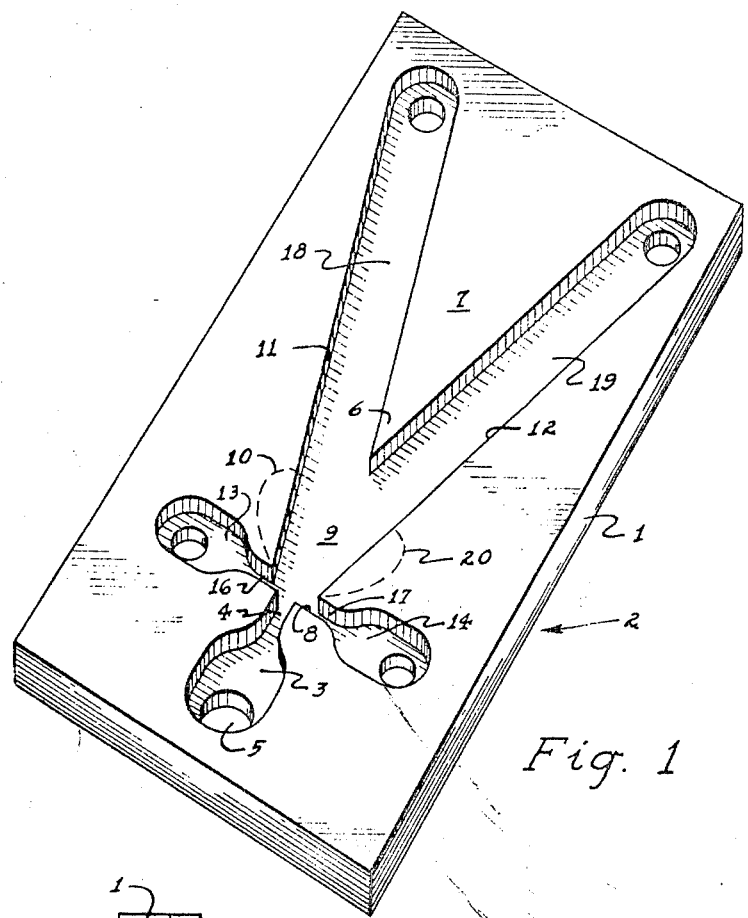
FIGURE 1 is a perspective view of one type of fluid amplifier arrangement which may be employed as an element of the apparatus of the present invention.
Figure 2:
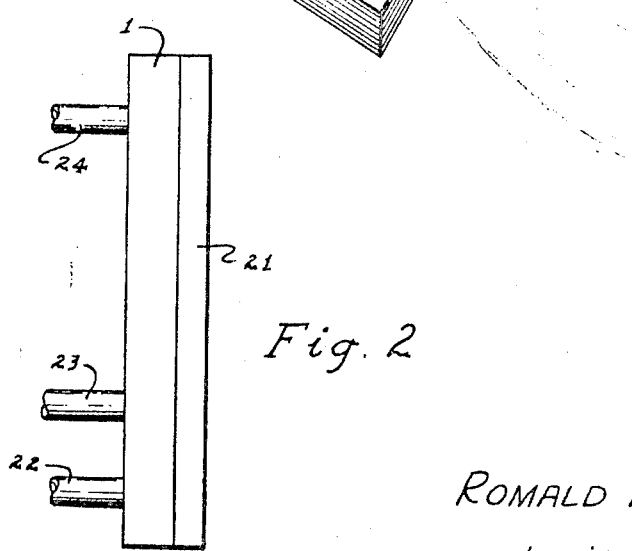
FIGURE 2 is a side view of the element of FIGURE 1.

Referring specifically to FIGURES 1 and 2 of the accompanying drawings, there is illustrated a pure fluid amplifier of the type with which the present invention is to be utilized. The amplifier is formed as channels in a plate 1 and is generally designated by reference numeral 2. The amplifier 2 comprises a power nozzle 3 adapted to be connected to a source of fluid under pressure (not illustrated) via an aperture 5 formed in the plate 1. The nozzle terminates in an orifice 4 for issuing a stream of fluid directed towards an apex 6 of a divider structure 7. The divider 7, as illustrated in FIGURE 1, is symmetrical with respect to the centerline of the orifice 4 and its apex 6 lies along the centerline at a predetermined distance downstream from the exit of the orifice. Orifice 4 of the nozzle 3 is formed in end wall 8 of an interaction region or chamber 9 further bounded by sidewalls 11 and 12 which are nominally parallel to the left and right sidewalls, respectively of the divider 7. The amplifier 2 may be provided with control nozzles 13 and 14 having orifices 16 and 17, respectively, extending through sidewalls 11 and 12. The orifices 16 and 17 are defined along their lower edge or side, as viewed in FIGURE 1, by the end wall 8 and therefore the streams issued thereby are perpendicular to the undeflected position of the main stream issued by the orifice 4.

The sidewall 11 and left sidewall of the divider 7 form a first output channel 18 and sidewall 12 and right sidewall of the divider 7 form an output channel 19.

In operation of the apparatus, fluid under pressure is supplied to the power nozzle 3 and issues from the orifice 4 in a well-defined stream which, when undeflected, divides equally at the apex 6 of the divider 7 between the output channels 18 and 19. By measuring or otherwise determining the difference in a particular flow parameter of the fluid passing through the channels 18 and 19, one may arrive at for instance an output signal indicative of the position of the stream relative to the apex 6. Thus, if the apex 6 lies along the centerline of the nozzle 4 and no fluid is supplied to the control nozzles 13 and 14 and further the apparatus is an analog type of device, equal quantities of fluid enter the channels 18 and 19 and no difference in signal is normally detected therebetween. The device of FIGURE 1 operates as an analog device if sidewalls 11 and 12 are cut back as indicated by dashed lines 10 and 20, respectively and if provision is made for equalization of pressure between the left and right pockets so formed. If, in an analog device, fluid is supplied to one or the other of the nozzles 13 and 14, the main power stream issuing from the orifice 4 is deflected so that more of the fluid enters one of the passages 18 or 19 and a difference of flow parameters may be determined which is a direct function of a corresponding parameter of the stream issued by one or the other of the control orifices. In the type of amplifier under discussion; that is, an analog amplifier with no feedback, as soon as the control signal or signals is or are removed, the power stream reverts to its center position and the flow divides equally between the two outlet passages 18 and 19. As indicated above, fluid may be withdrawn from one or the other of the orifices 13 and 14 to develop a local differential in pressure across the main stream so that the stream deflects towards the side of the interaction region 9 having the lower pressure. Also fluid may be supplied to the one or the other of the nozzles 13 and 14 at such a rate that a combination of stream interaction and pressure differential is employed to deflect the stream. Of course, fluid may be withdrawn or supplied to both input nozzles 13 and 14 concurrently with the stream being deflected in accordance with which of the streams or input signals is the greater. In any event, the output flow to one or the other of the outlet passages 18 and 19 in the presence of an input signal is greater than the flow supplied to the control nozzle required to produce the deflection of the main stream. In consequence, amplification is effected and a pure fluid amplifier employing no moving parts is provided.

Depending upon the position and shape of the sidewalls 11 and 12 the apparatus may operate as an analog amplifier as described above or as a flip-flop; that is, a bistable device in which the main stream flows to one or the other of the outlet passages 18 and 19. Such a vice is indicated by the solid lines of FIGURE 1. In such a device, the power stream attaches to one or the other of the sidewalls, for example, the sidewall 11 and therefore flows out of the outlet passage 18. If fluid is supplied to the control nozzle 13, the power stream is deflected towards the sidewall 12, attaches thereto and thereafter flows out the outlet passage 19 even after the control signal to the nozzle 13 is removed.

Figure 3:
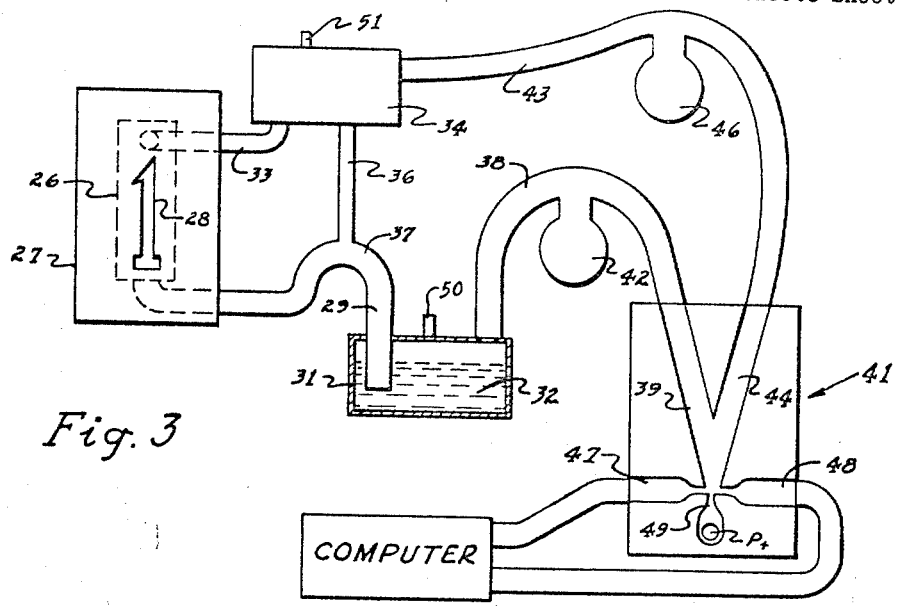
FIGURE 3 is a schematic diagram of one embodiment of the present invention.

As indicated above, the present invention is concerned with readout displays which may be actuated directly from a fluid stream issued through one or the other or both of the outlet passages of a fluid amplifier and which readout device is wholly compatible with such apparatus. In most instances, the fluid amplifier employed with the readout apparatus of the invention works into a load at least partially blocking the flow of air through the outlet passage. Further it is normally desirable to establish and maintain a display condition in response to a pulsed signal so that an input signal does not have to be maintained throughout the display interval. The specific type of fluid amplifier required to meet the requirements set forth above should have a bistable memory characteristic that is not essentially effected by the back pressure developed in driving into the load. Most of the systems described employ a memory type fluid device for this purpose but the invention is not restricted to use with such devices and several of the embodiments of the invention are described as employing monostable or analog elements. In order to provide a memory device, the apex 6 of divider 7 of FIGURE 1 would be moved downstream from the orifice 4 a distance equal to about fifteen times the width of the orifice 4. Alternatively, the divider 7 may be provided with a passage between the channels 18 and 19 so as to at least partially permit that fluid which cannot egress from, for example, channel 19 due to a load blocking the passage, to flow out of passage 18. Further structures permitting disposal of excess fluid are illustrated in FIGURES 3 and 5. A further type of memory device which may be utilized in most situations where the back pressure developed in the system is quite large is illustrated in the aforesaid Warren Patent No. 3,001,698 and the aforesaid French Patent No. 1,278,782. The more conventional type of bi-stable fluid amplifier, as illustrated in FIGURE 1, may be employed where bleed passages or apertures are provide in the system as discussed above.

Referring to FIGURE 2, the plate 1 is covered by and sealed to a plate 21 which encloses the passages in plate 1 and confines the power stream to its plane of deflection. Connections to the various channels are made from external supplies and receives by means of pipe connections to the channels in plate 1. Specifically, a pipe 22 brings fluid to the power nozzle 3 through aperture 5, the pipes 23 (arranged one behind the other so that only one is visible) connect with control nozzles 13 and 14 and the pipes 24 connect with output passages 18 and 19.

Numerous units may be formed in a single plate being interconnected, if desired, by means of further channels in the plate 1.

Referring now specifically to FIGURE 3 of the accompanying drawings, there is illustrated a first embodiment of a display device which may be utilized directly with a pure fluid amplifier. The display device employs a hollow transparent (glass, etc.) member or channel 26. The channel 26 is mounted behind an opaque card 27 having an opening 28 formed therein which is in the configuration of the character to be displayed, for instance, the numeral 1. The opening 28 of the card 27 is positioned in front of the hollow glass channel 26 so that the channel may be viewed through the opening. The hollow glass channel 26 communicates via a further channel 29 (a continuation of channel 26) with a reservoir 31 having a colored liquid 32 disposed therein. The other end of the channel 26 communicated via a pipe 33 with a second reservoir 34 and the reservoir 34 is connected to the pipe 29 via a small by-pass pipe 36. The pipe 36 interconnects with the channel 29 at a domed portion 37 for purposes to be described subsequently. The pipe 29 extends into the reservoir 31 below the surface of the fluid 32.

The reservoir 31 communicates via a tube 38 with an outlet passage 39 of a pure fluid amplifier generally designated by the reference numeral 41. In a generally horizontal section of the pipe 38, there is disposed a liquid trap 42 for purposes to be described subsequently. The reservoir 34 communicates via a tube 43 with a second outlet passage 44 of the fluid amplifier 41 and a second fluid trap 46 communicates with a generally horizontal portion of the tube 43. The fluid amplifier 41 is provided with control orifices or nozzles 47 and 48 and is also provided with a power nozzle 49. The reservoirs 32 and 34 are provided with fluid bleeds or outlets 50 and 51, respectively, also for purposes to be described.

In operation, it is initially assumed that the fluid stream from the power orifice or nozzle 49 is directed to the outlet channel 44 and enters the reservoir 34. The fluid may vent through the pipe 51 to the atmosphere so as to prevent the build-up of excess pressure therein and permit egress of excess fluid so that the amplifier 41 is not overloaded and caused to switch states in the absence of input signal. In order to effect more rapid return of the fluid to the reservoir 31 at the end of a display, the pipe 51 may be small enough so that a pressure above atmosphere may be developed in the reservoir 34 when fluid is supplied to passage 43.

When it is desired to produce a numeral display, the fluid in the reservoir 32 is caused to pass through the pipe 29 and into the hollow tube 26 so that the colored fluid appears behind the opening 28 in the card 27 to effect display. In order to accomplish such a display, a fluid signal is applied to the control orifice 48 and causes the fluid stream to attach to the left sidewall of the fluid amplifier 41 and pass through the outlet passage 39 into the reservoir 32. A pressure is developed over the liquid in the reservoir 31 which is a substantial portion of the pressure supplied to the power nozzle 49.

This pressure causes the liquid to pass through the tube 29 and into the transparent pipe 26. Any air (or other gas if an air system is not employed) which may have been trapped in the pipe 29 is caught in the dome 37 and passes through the pipe 36 to the reservoir 34. Also if air enters the pipe 29 due to the fluid 32 being below the end of pipe 29, this air passes up through the pipe 36 rather than through the display tube.

It should be noted that when a power jet is switched, say to the outlet passage 39, it entrains fluid on its right side and partially reduces the pressure in the outlet channel 44. This reduced pressure is communicated to the reservoir 34 and therefore tends to increase the rate at which the fluid rises in the tubes 29, 36, and 26 so as to increase the speed of the response of the display apparatus to switching of the fluid amplifier.

It is important because of the reduced pressure in channel 43 that the liquid in the reservoir 31 fall below the end of pipe 29 before the liquid reaches the end of pipe 43 or else liquid will be drawn into the pipe. When it is desired to discontinue the display a signal is applied to the control nozzle 47 producing switching of the power stream issued from the nozzle 49 to the outlet passage 44. Pressure is now built up in the reservoir 34 which, in conjunction with gravity return and the reduction in pressure in the outlet channel 39 which is communicated to the reservoir 31 via the pipe 38, causes the fluid to be drained from the tubes 26 and 29 and returned to the reservoir 32. Fluid that has entered the reservoir 34 may also return to the reservoir 31 via the pipe 36 to thereby decrease the volume of fluid which must pass through the transparent pipe 26. The liquid traps 42 and 46 are employed to accumulate or collect any liquid which may be entrained in the operating fluid of the amplifier 41 so that this fluid does not accumulate in the amplifier itself or the various nozzles and supply passages thereto.

The apparatus of FIGURE 3 has been described as a bi-stable device in that the power stream of the amplifier 41 retains its deflection to one outlet passage or the other even after removal of the control signal. The amplifier 41 may be simply bi-stable or may readily be formed as an analog amplifier by cutting back the sidewall of the interaction region. In such case, control signals are required to be supplied to the amplifier 41 at all times. Alternatively, a combined analog and bi-stable system may be employed. If a wholly analog unit is employed as illustrated in FIGURE 1 by the dashed lines 10 and 20, control signals are supplied to both input nozzles 13 and 14 the height of the liquid in the tube 26 is a function of the relative pressures of the input signals and tube 26 may be calibrated to ambient pressure.

Figure 4:
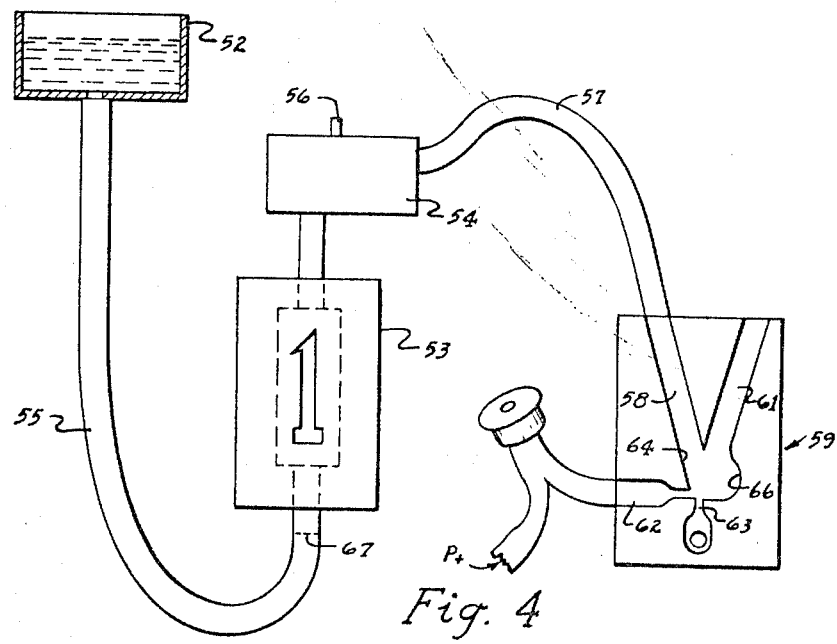
FIGURE 4 is a schematic diagram of a second embodiment of the present invention utilizing a fluid element different from that illustrated in FIGURE 1.

Referring now specifically to FIGURE 4 there is illustrated a readout apparatus of the latter type. In this apparatus, the number is displayed by gravity feed of a colored liquid from a reservoir 52 through a U-shaped tube 55 to a region thereof having a numerical display device 53 of the same general type as illustrated in FIGURE 3. There is provided a chamber 54 vented to the atmosphere through a vent pipe 56 and also connected via a passage 57 to an output channel 58 of a fluid amplifier designated by the reference numeral 59. The amplifier is provided with a second output channel 61, a control nozzle 62 and a power nozzle 63. Left sidewall 64 of the amplifier 59 is positioned so as to provide boundary layer lock-on of the jet to the wall 64 and fluid supplied by the nozzle 63 normally flows to and through the outlet passage 58. A right sidewall 66 of the amplifier 59 is set back so that the right half of the amplifier operates as an analog unit in that boundary layer lock-on does not occur within the normal operating pressure range. Thus, when the fluid issues from the power nozzle 63 in the absence of a control stream, the fluid flows through the passage 58. When a fluid is supplied to the control nozzle 62, the fluid is diverted to the outlet passage 61 and remains there only so long as the control signal is applied to the nozzle 62. As soon as this signal is discontinued, the power stream, due to boundary layer lock-on, again returns to the outlet passage 58. The amplifier 59 is then an asymmetrical unit and the method employed to achieve it in FIGURE 4 is one of several methods available to obtain this type of operation.

In the absence of an input signal, fluid flows through the channel 57 to the reservoir 54. The fluid in the right leg of the U-shaped tube 55 assumes the position indicated by the dotted horizontal line 67. In this position, the fluid is below the card 53 and the numeral displayed thereby so that display is discontinued. Upon the application of a signal to the control nozzle 62 and diversion of the power stream to the outlet channel 61, the pressure in the reservoir 54 decreases to ambient pressure or slightly lower and the fluid in the right leg of the tube 55 seeks its own level which is above the card 53. Display fluid is therefore provided behind the numeral or character formed in the card 53 and display is achieved. The vent tube 56 is employed to permit rapid equalization of the pressure of the chamber 54 with the ambient pressure when the fluid stream is switched to the outlet channel 61 to effect display and is further employed to permit escape of excess air or excess fluid when the stream is directed to the chamber 54 and held in this position. The hump in the pipe or tube 57 is employed to prevent the reduce pressure in output channel 58, when the stream is switched to channel 61, from drawing fluid back into the fluid amplifier.

It is not essential to the operation of the apparatus to provide reservoirs for the liquid and reference is now made to FIGURE 5 of the accompanying drawings which illustrates a display apparatus in which the reservoirs have been eliminated as individual components and the interconnecting channels serve this function. The apparatus includes a multistable fluid amplifier generally designated by reference numeral 68 having a power nozzle 69, control nozzles 71 and 72, output channels 73 and 74, and pipes or vents 76 and 77 associated with outlet passages 73 and 74, respectively. The outlet channel 73 is connected to a vertical tube 78 which forms one leg of a U-shaped pipe arrangement generally designated by the reference numeral 79. A left leg 81 of the U-shaped member is connected via a pipe 82 to the right outlet passage 74 of amplifier 68. The U-shaped pipe 79 may be transparent or only the leg 81 thereof may be transparent. A display card 83 is disposed in front of the leg of the pipe 81 and has a character to be displayed formed as a transparent area therein, the remainder of the card 83 being generally opaque.

In operation, if the stream issued by the power nozzle 69 is directed to the outlet passage 74 and held in this passage by boundary layer effects, then there is no display since the colored fluid to be employed in the display is held in a position bounded by the horizontal dashed lines 84 and 86. The pressure differential between the outlet passages 73 and 74 is chosen to be equal to the differential in pressure created by the height of the fluid in the leg 78 as opposed to the height of the fluid in the leg 81 of the U-shaped member 79. To prevent back loading of the amplifier to such an extent as to cause unwanted switching of the power stream the vent pipes 76 and 77 are employed to spill excess fluid.

When it is desired to produce a display of the character formed on the card 83, an input signal is applied to the input nozzle 72 causing the power stream to switch to the outlet channel 73. The fluid under the pressure supplied by the fluid rises in the leg 81 to a position corresponding to the level of dashed line 86 associated with the leg 78. The fluid is now behind the card 83 and produces a display. Again, the differential in pressure across the outlet channels 73 and 74 is equal to the pressure or more specifically the weight of the fluid in the leg 81 as opposed to the weight of the fluid in leg 78. Thus, in this display apparatus only a single fluid element is employed and no reservoirs are required for the fluid.

FIGURE 6 illustrates an arrangement employing two fluid amplifiers 87 and 88 for controlling a number display. The devices 87 and 88 are identical and are asymmetrical units in that in the absence of an output signal they supply fluid to output passages 89 and 91 of the units 87 and 88, respectively. An input signal supplied to a tube 92 would be delivered through the connections provided to control nozzles 93 and 94, respectively of the units 87 and 88. The unit 87 is provided with a further output passage 96 which discharges to P—. Output passage 89 however is connected to the upper end of a U-shaped member 97 formed of hollow, transparent tubing such as glass. The U-shaped member has a left leg 98 and a right leg 99 with the right leg being connected to the output passage 104 of the amplifier 88. An opaque card 101 is arranged in front of a portion of the leg 98 of the member 97 and has the numeral or character to be displayed formed therein as a transparent area. It will be noted that in the unit 87 a cusp 102 is formed by the left sidewall of the entrance to the passage 96 and a corresponding cusp 103 is formed in the unit 88 at the intersection of its right sidewall and the right wall defining a second outlet channel 104. These cusps are employed to provide negative feedback which increases the "return speed" operation of the system.

In operation, under normal conditions, fluid is supplied to the outlet passages 89 and 91 of the elements 87 and 88 and element 87 applies pressure to the top of the pipe 98 of the U-shaped hollow tubing 97 so that fluid in the hollow U-shaped member is forced out of the leg 98 and therefore out of the display region. The tubing and the numeral being transparent and colorless insure that substantially no display is provided. When it is desired to display the numeral, an input signal is applied to the pipe 92 which causes the units to switch fluid to passages 104 and 96. The liquid in leg 98 rises behind the card 101 and a display is provided. Removal of the signal from the pipe 92 permits the power streams to issue through outlet passages 96 and 91 of the devices 87 and 88 and display is discontinuted.

When the power stream is directed to the outlet passages 96 and 104, a small portion of the fluid is taken off by the cusps 102 and 103 and caused to be redirected against the side of the power stream opposed to control nozzles 93 and 94 respectively. The amount of fluid thus fed back and impinging against the side of the stream is insufficient to produce complete deflection thereof due to the fact that by proper proportioning of the amplifier, the effect of the input fluid signal is considerably greater than the effect of the feedback fluid. However, upon termination of the input signal, the fluid being fed back against the power stream by cusps 102 and 103 enhances the return switching rate of the power stream to the opposite outlet channels 89 and 91 respectively. Thus, the switching action is a function both of momentum interchange due to the fed-back fluid impinging against the power stream and boundary layer effects between the power stream and the right sidewall of the unit 87 and the left sidewall of the unit 88. This arrangement provides for rapid return switching of the basic amplifier units and therefore rapid change in the display. The amplifiers 87 and 88 are or may be provided with vent pipes (not shown) such as the vent pipes 76 and 77 in the amplifier 68 (FIGURE 5), to prevent undue back loading of the amplifiers and bubbling of control fluid through the display liquid.

Regardless of the speed of switching of the amplifier elements there is of necessity some delay in discontinuance of display due to the necessity of draining the liquid from the tube and when driven by a gas due to adherence of display liquid to the walls of the tube. Specifically, although the main body of the fluid may respond quite rapidly to a reversal of pressures at the two ends of the column of liquid, the adherence of the display liquid to the surface of the tube delays the time at which complete discontinuance of display is effected. In order to overcome this difficulty, and in accordance with a further embodiment of the invention, immiscible liquids are employed in the display portion of the apparatus. One of the liquids is colored to provide the display and the other liquid is colorless so that when it is located in the display region, no display is provided. The use of vents 80 and 85 at the uppermost regions of pipes 98 and 99, respectively, should be noted. These vents provide for escape of air and prevent build up of excess pressure in the system.

Figure 7:
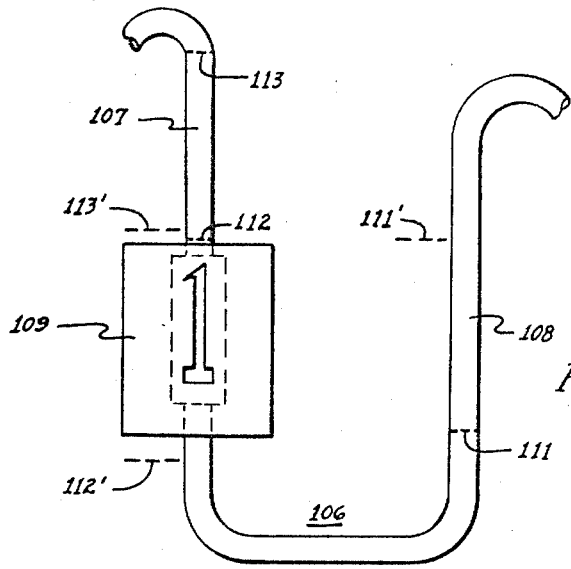
FIGURE 7 is a partial schematic diagram of the visual display portion of a display apparatus.

Reference is now made specifically to FIGURE 7 which illustrates the display portion only of such an apparatus. The display portion comprises again a U-shaped member 106 having a left leg 107 and a right leg 108. An opaque card 109 is arranged in front of the portion of the leg 107 of the U-shaped member 106 and has a transparent character to be displayed formed therein. In display position, the colored liquid is, in FIGURE 7, disposed between a dashed horizontal line 111 and a second dashed horizontal line 112 in the leg 107. A clear fluid immiscible with the aforesaid colored fluid is arranged between the dashed line 112 and a horizontal dashed line 113. The apparatus is illustrated in the display position so that the colored fluid is behind the character formed in the card 109. Under these circumstances, fluid under pressure is applied to the leg 108 and the pressure therein causes the fluid to assume the positions illustrated.

When it is desired to terminate display, fluid under pressure is applied to the top of the leg 107 and the fluids assume the positions illustrated by the dashed horizontal lines arranged just outside of and just to the left of each of the legs 107 and 108. Specifically, the colorless transparent fluid is now arranged between dashed lines 113' and 112' and the colored fluid is disposed between the leg 112' and the dashed line 111'. Since the two fluids are immiscible, the colorless fluid in moving down the tube 107 wipes the interior of the tube 107 clean as the fluid moves and therefore the display is immediately terminated upon movement of the main body of the fluid. The arrangement of FIGURE 7 when employed in conjunction with the arrangement of FIGURE 6; that is, the type of amplifiers designated by reference numerals 87 and 88, provides for very rapid switching of the display apparatus.

Thus far, the system has been described as providing a display of the numeral 1 only since this numeral provides for the easiest display and therefore simplifies the description. The techniques illustrated in FIGURES 3 through 7 may be employed for displaying any numeral or character and the manner in which the various characters may be constructed is illustrated in FIGURE 8.

Figure 8:
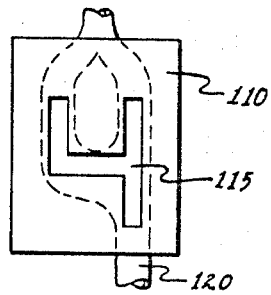
FIGURE 8 is an illustration of an arrangement for illustrating a character other than the numeral 1 illustrated in the other figures.

Referring specifically to FIGURE 8, a card, such as a card 110, is opaque and has a plurality of openings 115 formed in the card 110. Any character desired may be construction arranged behind the card 110 is illustrated in dashed lines and generally conforms to the figure 4 but provides for convergence of the tubes forming the right and left legs of the 4 towards the top of the display card 110. Fluid is supplied through a bottom vertical tube 120 of the hollow glass tube system and rises to above the cut-out portions of the card 110 so as to fill all of the portions of the tube behind the character 115 formed in the card 110. Any character desired may be formed in this manner and it is apparent that the invention is not restricted to display of a numeral 1 only.

In each of the embodiments of the invention thus far described, it has been assumed that the numeral is formed as a transparent portion of an opaque card. It is apparent that the card may be removed and the tube in which the fluid moves, painted to provide transparent and opaque regions defining the numeral or other character to be displayed in the transparent region. Further, the display apparatus thus far illustrated displays only a single character. In actual character display systems for the readout of digital information, a number of the various devices as illustrated in FIGURES 3 through 8 are arrayed side by side or one under the other so that various groupings of the characters may be achieved. For instance, if it is desired to provide a base ten numerical readout, ten devices, for instance, such as those illustrated in FIGURE 7 may be arrayed one under the other in a column to provide a single decade display and if a number up to 999 is to be displayed, three such columns would be provided. The digital information to be read out is applied to selected fluid amplifier devices from, for instance, fluid memory units so that in the conventional manner, the complete number may be read with the most significant digit in the lefthand vertical column and the least significant digit in the righthand vertical column. Of course, the columns could be arranged horizontally so the most significant digit was in the top horizontal column and the least significant digit in the bottom column.

In still another system, a traveling display may be provided by arranging a plurality of decades or larger units at each location where information is to be displayed. The displays are actuated by a fluid shift register system including one shift register for each unit of each decade. If numerals zero through nine are to be displayed at each location, ten display units are arrayed at each display location. Ten parallel shift registers are provided and each stage of a given shift register is connected to control the same character at each location and each shift register controls a different character. A character to be displayed is determined by applying a binary one to the first stage of the shift register associated with that character at each display location. As the binary one is stepped through the register the character is stepped along the display. A binary one at a given location causes fluid to be applied to the proper control nozzle of the display element to effect display; for instance, nozzle 48 in FIGURE 3.

The number to be displayed may be selected by a pneumatic keyboard as illustrated in FIGURE 16. Alternatively each display apparatus may be controlled directly from one such keyboard so as to provide concurrent display of the same number at all locations.

In each of the systems thus far described, either front or back lighting may be employed so as to provide the requisite display. In a particular system where the character is transparent and colored liquid is employed to produce the display, front lighting would normally be employed. The entire system may be made to operate with a reverse operation to that described in that the liquid may be made opaque and back lighting employed. Thus, when the liquid is behind the numeral, no light is transmitted through a transparent tube and that particular character is not displayed. When the opaque liquid is removed, and either air or a clear liquid with which the opaque liquid is immiscible, move behind the card display, then light proceeds through the character and display is achieved. Either type of display may be employed but the latter type requires the connection of the output channels of each of the various fluid amplifiers employed to be reversed relative to connections illustrated in FIGURES 3–7. For instance, in FIGURE 3, the output channel 44 would be connected to the tube 38 and the output channel 39 connected to the tube 43.

Figure 9:
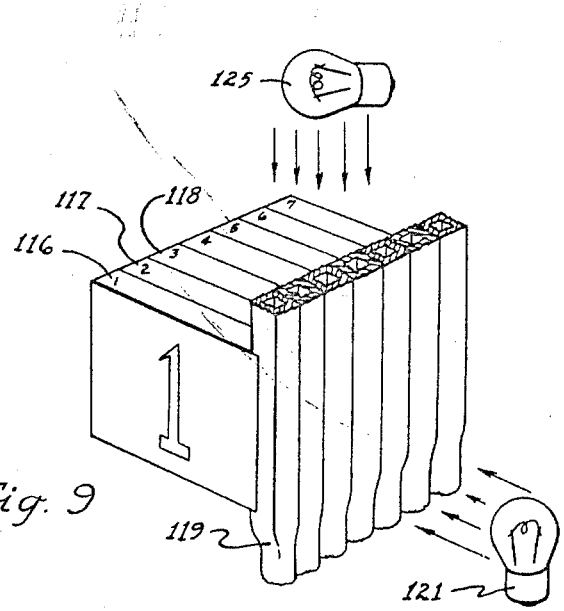
FIGURE 9 is a perspective view of a visual display arrangement employing a light valve adapted to be controlled by a fluid amplifier.

In order to provide different types of illuminated displays various other systems may be employed. Referring now specifically to FIGURE 9 of the accompanying drawings, there is provided a plurality of flat Lucite plates 116, 117, 118, etc. there being seven such plates illustrated. Each plate has inscribed on the front surface thereof a different character; for instance, the plate 116 has the character or numeral "1" inscribed thereon in the form of grooves cut into the front surface of the Lucite plate. If it is wished to display, for instance, numbers 1 through 9 and zero, ten such plates are provided with each plate having a different one of the aforesaid numerals inscribed thereon. Secured to the right edge, as viewed in FIGURE 9, of each of the Lucite plates is a hollow chamber 119 which may be one leg of a tube of the type employed in FIGURES 3–8. One difference lies in the fact that the right edge of the Lucite plates forms one wall of the tubes 119. A source of light 121 is projected onto the edge of each of the plates 116, etc. through its associated tube 119. When it is desired not to display a character its associated tube 119 is filled with an opaque liquid. In consequence, light from the source 121 does not impinge upon the right edge of the associated plate 116 and the numeral is not illuminated. Display of a particular numeral is effected by simply withdrawing the opaque fluid from its associated tube 119 so that the light from the source 121 may edge-light the Lucite plate and therefore produce display of its associated character.

The apparatus of FIGURE 9 may be employed in another manner. The edges of the plates 116, 117, 118, etc. adjacent the tube 119 are heavily frosted and a light source 125 has its rays directed through open upper ends of the tubes parallel to the axis of the tubes. The top surfaces of plates 116, 117, 118, etc. are opaque. The liquid in the tubes 119 has substantially the same index of refraction of glass so that when the tubes 19 are full of liquid, the light sees smooth continuous surface, no refraction or reflection occurs and none of the light is scattered onto the plate. When it is desired to display a particular character, the liquid in the tube is withdrawn and the frosted surface is exposed to the light. The light is scattered into the plate and the numeral displayed. When liquid is withdrawn from the tubes, the surface of the Lucite plate remains wetted. However, due to the fact that, when the liquid is withdrawn, air circulates against the frosted surface and the turbulence which is produced, provides relatively rapid drying of the frosted surface to institute the display.

Figure 10:
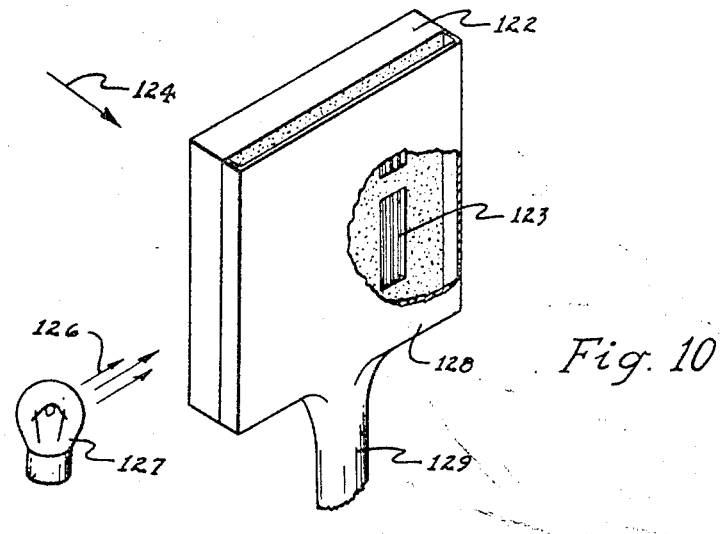
FIGURE 10 is a perspective view of another display arrangement employing a light valve controllable by a fluid element.

The principles of the apparatus of FIGURE 9 is also employed with the apparatus illustrated in FIGURE 10. A Lucite plate 122 has a character 123 formed therein which is to be displayed. In this arrangement, a character 123 is formed as grooves in the front surface of the plate, the arrow 124 indicating the direction of viewing and an arrow 126 indicating the direction that light is directed towards the plate 122 from a source 127. In an actual embodiment, a number of plates such as the plate 122 may be stacked one behind the other each with a different character displayed by each plate. The rear surface of the plate 122 is frosted. A chamber 128 is formed across the entire rear surface of the plate 122 or immediately behind the character and is adapted to have liquid, having the same index of reflection as the Lucite plate 122, supplied thereto via a tube 129. The level of liquid in the tube 129 and chamber 128 is controlled by a fluid amplifier as in the prior embodiments. When liquid is applied to the chamber 128 the character 123 is no longer visible when viewed from direction 124. However when liquid is withdrawn light is scattered by the frosted surface and the numeral 123 is illuminated.

In each of the embodiments thus far described, the characters to be displayed are individually formed either by means of a card, such as card 83 in FIGURE 5, or by means of the character being cut into the surface of a plate, such as in the apparatus of FIGURE 10. It is not essential that such an arrangement be employed and display may be achieved by building up characters by means of a font, such as a 5 x 7 pattern of dots. In such a system, for instance, a plurality of light conducting rods 131 may have, for instance, their left ends arrayed to provide a 5 x 7 font as generally designated by the reference numeral 132 and have their other ends arrayed in a line or other geometrical arrangement which permits ease of access of these ends to a light shutter such as employed in FIGURE 9. More specifically, there is provided a plurality of tubes 133 each covering an end of the different light conducting rod 131, the tube 133 forming one leg of a U-shaped member 134. The U-shaped member may be of the type employed in FIGURE 7 of the accompanying drawings and have therein an opaque liquid in the region indicated by the dashed horizontal lines 135. When it is desired to prevent display of a particular dot, the liquid is raised to cover the end of the tube 131 so as to prevent light from a source 137 from entering the tube 131. When it is desired to have the particular dot displayed, the liquid is withdrawn so that light from the source 137 may pass through the transparent tube 133 and to the light conducting rod 131 so as to be displayed at the end of the rod which is located in the 5 x 7 font. It is recognized that as an alternate the dots to be displayed may be dark and the balance of the dots illuminated if desired.

Figure 11:
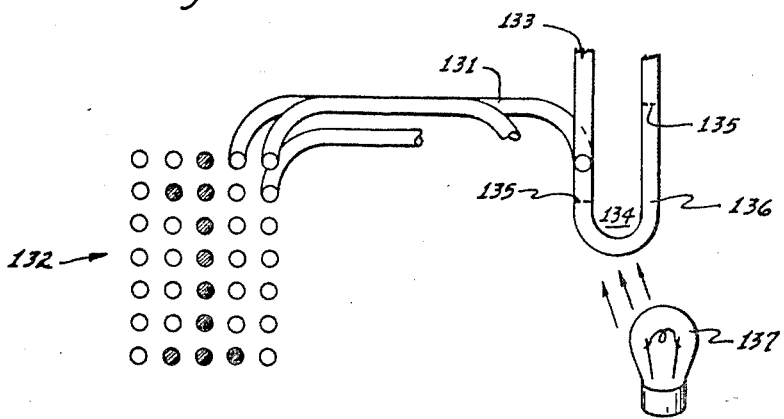
FIGURE 11 is a schematic illustration of a light display arrangement employing fluid techniques controlling the transmission of light to a 5 x 7 font display head.

The type of pattern display provided is illustrated in FIGURE 11 by the darkened dots which in this particular instance provide a display of the numeral "1." In such an arrangement, thirty-five different control elements, such as the types illustrated in FIGURES 3, 4, 7, etc. must be provided one for controlling display of light from each of the thirty-five dot elements in font 132.

Figure 12:
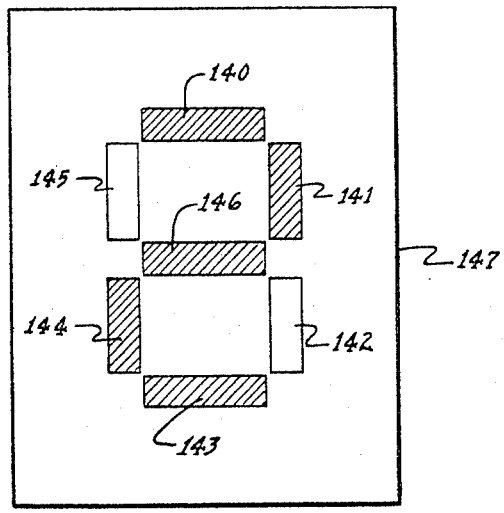
FIGURE 12 is an illustration of a display arrangement employing seven distinct bar light arrangements for providing numeral display.

The number of elements required for control may be reduced, if numerals only are to be displayed, by employing a bar light type of numeral display. Referring specifically to FIGURE 12 of the accompanying drawings, a bar light display comprises seven distinct display segments. In this system, there are seven hollow and transparent tubes 140 through 146 arranged generally in a figure "8." Light is positioned behind the tubes and the entire display assembly is opaque except for the tubes themselves which are transparent. This display may be readily accomplished by placing a card such as a card 147 in front of the tubes 140 through 146 and providing cut-out portions in the card so as to display the tube portions as illustrated. Normally all of the tubes are filled with an opaque liquid. When it is wished to display a particular character or numeral, liquid is withdrawn from those elements which are to be illuminated to form the numeral. For instance, in FIGURE 12, the numeral "2" is displayed; this being indicated by the sectional lines in the tubes 140, 141, 146, 144 and 143 to indicate the tubes that pass light. The tubes 141 and 144 may be connected as in any one of the systems of FIGURES 3 through 7. The tubes 140, 146 and 143 although susceptible to control by the same arrangements as in the other figures, require a change in the levels of the fluids in the tubes.

Figure 13:
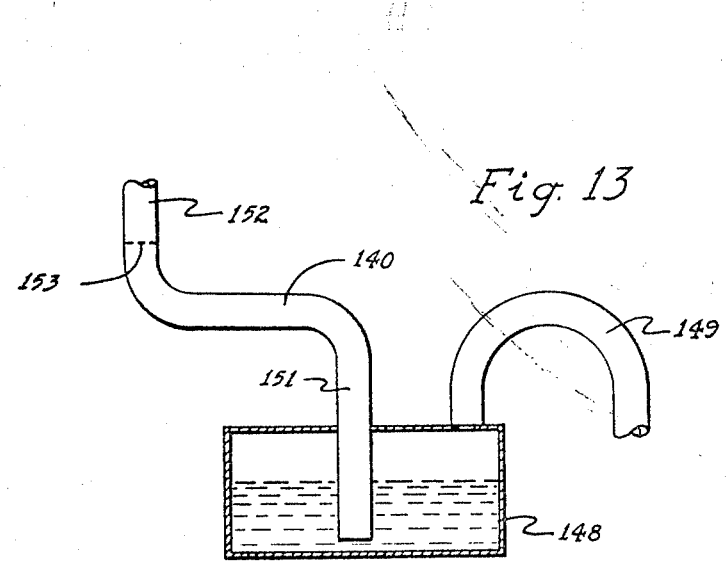
FIGURE 13 is a schematic diagram of a light valve arrangement for use in FIGURE 12 which arrangement is controllable by a pure fluid system.

A system for controlling the liquid in horizontal tubes for display purposes is illustrated in FIGURE 13. In such a system, the opaque fluid is stored in a reservoir 148 which is closed at its top and communicates via a tube 149 with a fluid amplifier element. When it is desired to discontinue display of the particular element, the output flow of the amplifier is applied to the tube 149 which creates a pressure above the upper surface of the opaque fluid in the reservoir 148. One of the horizontal tubes such as the tube 140 forms a portion of a tube system including a vertical downwardly descending leg 151 which extends into the fluid in the reservoir 148. The other end of the tube 140 is connected to an upwardly extending leg 152 so that when the output flow of the fluid amplifier is applied to tube 149 the liquid in the reservoir 148 rises through the tube including the elements 151, 140, and 152 to the position generally indicated by the dashed horizontal line 153. The upper end of the tube 153 may or may not be connected to another fluid amplifier as desired and a transparent immiscible fluid may be arrayed in the tube 152 so that when it is desired to initiate display the immiscible fluid contained above the dashed line 153 wipes the tube 140 clean so as to provide rapid display of this segment of the character; that is, to permit light to shine therethrough.

In providing a display of this type the principles of the system disclosed in FIGURE 9 may be employed in that the members 140 through 146 may actually be grooves formed on a Lucite plate and a separate control is provided for each of the bars in that when it is wished to display a particular bar a fluid is removed from contact with the frosted surface of the Lucite plate. The arrangement of FIGURE 9 may also employ seven plates, each having a different one of the bars 140 to 146 formed thereon. The system of FIGURE 10 may also be employed.

In each of the arrangements discussed so far herein, the operating display element has been a fluid, preferably a liquid which has been moved into a position relative to a display element so as either to permit the passage of light to the element or to block the passage of light to the element or to move a colored fluid into position to produce a display by means of a colored fluid. In these systems, the use of the fluid permits the display apparatus to be utilized with a fluid amplifier system employing no moving parts and to provide direct coupling between the display and the fluid amplifier without the requirement of moving parts. The reason for the emphasis on the elimination of moving parts if to carry forward into the display field, the basic underlying philosophy of fluid amplifiers which is to provide wholly fluid systems that are not subject to the usual difficulties experienced when moving parts are employed in a system. These difficulties arise from wear, lubrication, speed of response, cost of manufacture and finishing, etc. However, one type of visual display apparatus which does not defeat any of these purposes but which does employ moving parts is provided in accordance with the present invention. This system employs light-weight balls which form the display elements in a font arrangement such as the 5 x 7 font illustrated in FIGURE 11. The balls employed weigh only a few grams and may be painted white so as to provide a readily visible, front lighted, display when the balls are moved into a display position. The balls may be painted with a luminescent paint so that they luminesce when moved into a display position, due to front lighting of the display arrangement or the balls may be opaque in a back-lighted assembly so as to block light. The system employing the light weight balls, however, must be compatible with the basic concepts of fluid amplifiers; that is, no need for lubrication, no reduction in speed of response, negligible wear, and the device must be simple and have a low cost.

Figure 14:
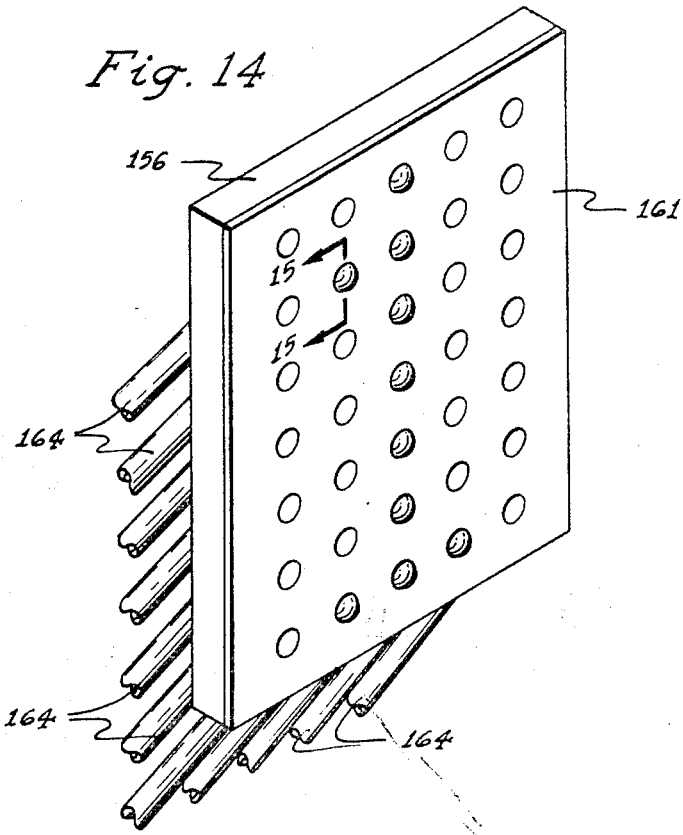
FIGURE 14 is a perspective view of a 5 x 7 font display in which the display elements are small balls.
Figure 15:
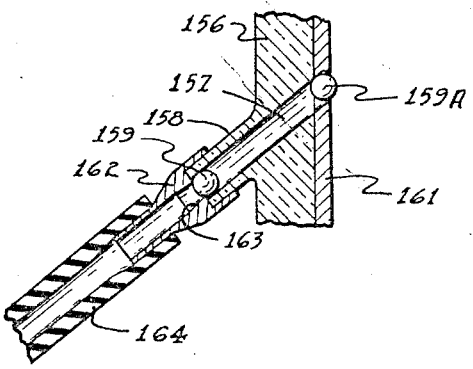
FIGURE 15 is a sectional view taken along line 15—15 of FIGURE 15.

In accordance with this embodiment of the invention and reference is now made to FIGURES 14 and 15 of the accompanying drawings, a plastic plate 156, preferably molded, is provided with a plurality of channels 157 therethrough. The channels 157 are slanted upwardly at a relatively sharp angle from the back to the front of the plate, the front herein referring to the display surface of the plate. The channels are arranged so that their openings in the front surface of the panel 156 provides a 5 x 7 font of openings. The molded plate has a plurality of integral hollow tubes or pipes 158 extending downwardly from the back of the plate, the channels through the tubes 158 being in exact alignment with the channels 157 forming a continuation thereof. Each of the channels 157 is intended to receive a different light weight ball 159 which are to form the display elements of the apparatus. The angle of the channel 157 and the length of the channel taken in conjunction with the additional length provided by the short pipe 158 must be such that when the ball falls out of the display position, due to gravity or due to suction, the ball is completely removed from the display area so as to provide complete discontinuance of display of that element. The ball, as will be described more fully, is moved into the display position by means of air flow proceeding upwardly through the pipe 158 which raises the ball to its forward and upwardmost position. For ease of manufacture, although other methods may be employed as will be described subsequently, the ball is limited in its forwardmost position by a plate 161 which may be made of metal and which has drilled therein a plurality of holes providing a 5 x 7 font in alignment with the openings of the channels 157 into the front face of the block 156. The holes drilled in the plate 161 may be slightly tapered and the forwardmost portions of the holes are smaller than the maximum diameter of the ball 159. The plate 161 therefore prevents the balls from being blown out of the channels. However, the holes in the plate should not be too much smaller than the diameters of the balls 159 so that a maximum portion of the balls, commensurate with retaining them in their channels, may be displayed.

When a ball falls, due to the forces of gravity or due to suction, to its rearward and downwardmost position, it also must be retained in the channel. This is accomplished for instance by means of a coupling sleeve 162 which may or may not be of metal and which provides an inwardly extending circular shoulder 163 having an inner diameter just small enough to prevent the ball from falling therethrough. The opening, however, is not so small as to materially obstruct the flow of air therethrough. Connection to the member 162 may be made by any suitable means such as a tubing 164 connected to an output channel of a fluid amplifier which is to control display of that particular element.

In manufacture, the plate 156 and the short tube or pipe 158 with the appropriate channels formed therein are fabricated in a single molding operation which provides an unusually cheap display element. It is possible to form the reduced diameter portions at the lower end of the pipe 158 and at the upper, front end of the channel 157; that is, the plate 156. However, such a procedure; that is, providing the constriction on both ends of the channel during the molding operation, somewhat complicates the fabrication technique. On the other hand, a constriction may be readily formed at one end of the channel; such as, the front end of the channel 157, so that the plate 161 may be eliminated. If this procedure is followed for restricting forward movement of the balls, it is desirable to either fabricate the member 156 from opaque material or render it opaque by painting or other conventional techniques for front lighted display.

In operation of the system, it is evident from the prior descriptions, that upon air being supplied to an output channel of a fluid amplifier connected to a particular tube 164, air proceeds upwardly through the system and carries the ball 159 into the display position as illustrated by the upper ball 159A in FIGURE 15. Due to the light weight of the ball which, as indicated may be only a few grams, the response of this system is rapid and actually can be as quick as the eye can detect. Of course, once the air flow is terminated, the forces of gravity and suction return the ball to its lowermost position and in order to speed this process the angle of the channel 157 with the horizontal should be as large as practical in a physically realizable system.

As will be understood from the operation of a fluid amplifier of the type illustrated herein and reference is made to FIGURE 3, when the fluid main power stream from the main nozzle 49 is directed for instance to the output channel 44 some of the fluid in the channel 39 is entrained in this stream and the pressure in channel 39 is reduced. In every instance of the present application, this reduction in pressure enhances the speed at which the system returns to the display condition called for by the switching to the output channel 44. The differential in pressure created by the reduction in pressure in channel 39 is also effective in the apparatus of FIGURES 14 and 15 since the pressure inside the tube 164 is below atmospheric or ambient pressure operative at the face of the plate 156. The system of FIGURES 13 and 14 meets all of the basic requirement of a display system which is completely compatible with pure fluid amplifiers in that its speed of response for its intended purpose is more than adequate, being actually faster than the human eye can detect. The parts do not exhibit significant wear, they do not require lubrication, they do not require expensive manufacture and they are of such a size and weight to be completely compatible with small logic elements employed in digital systems, the output information from which is to be visually displayed concurrently with accumulation and generation of the information.

The concepts demonstrated in FIGURES 14 and 15 may be employed under a completely liquid display by replacing the balls with an opaque liquid. The front plate 161 is a solid plate in this instance and the display is back lighted. An air bleed must be provided at the upper end of end pipe 164 to permit escape and return of air from and to the system respectively. In this embodiment the plate 161 is opaque except at the end of each tube 164.

Referring specifically to FIGURE 16 of the accompanying drawings, there is illustrated a system for controlling display of individual balls 159 so as to provide a letter or numeral in the 5 x 7 font arrangement. The system of FIGURE 16 is arranged to display a number or letter in accordance with a character selected by a conventional keyboard. The conventional keyboard actually does not provide for actuation of the keys and in order to operate the display, the finger must be brought into contact with the top of the individual keys indicating the specific character to be displayed. More particularly, there are provided a plurality of keys 166 only two of which are illustrated, the keys being centrally apertured as indicated by reference numeral 167 so as to provide for escape of air through the top of the key. The aperture 167 in the key is connected to a tank 168 having a number of inlet and outlet passages thereto. Fluid under pressure is supplied to the tank 168 via an input tube 169 and there are provided outlet tubes 171 through 181. Al of the tubes 171 through 180 are connected either directly or each through a further fluid amplifier to a control nozzle of a distinct fluid element, such as the control nozzle 182 of the bi-stable element designated by the reference numeral 183. The flip-flop 183 is provided with a second control nozzle 184 connected to an outlet pipe 181' of a second key and chamber arrangement generally designated by the reference numeral 186.

The amplifier 183 is provided with a splitter 187 which is slightly asymmetrical with respect to the centerline of the supply nozzle 188 of the fluid amplifier 183 so that when the system is initiated; that is, is first turned on, fluid flows out of the element 183 to an outlet channel 189. The element is still bi-stable; that is, when a signal is applied to the nozzle 182 to deflect the stream to a right output channel 191, the stream remains in that position even after removal of the signal from the channel 182. The asymmetry of the divider 187 is just sufficient to initially cause the fluid to flow to the output channel 189 in the absence of any signals.

The key element 166 is assumed, for purposes of explanation, to provide for display of the numeral "1" by the apparatus of FIGURES 14 and 15.

Referring to FIGURE 11 it is seen that ten of the balls 159 of the 5 x 7 font must be moved into the display position. Each of the tubes 164 which control these ten balls is connected to an output channel of a different fluid amplifier associated with the key 166. Thus, and reference is made to the single element illustrated; that is, the element 183, its outlet channel 191 is connected to the pipe 164 associated with one of the ten elements or balls. The pipes 171 through 179 associated with the key 166 are each connected to a different flip-flop element which is adapted to control one of the other balls required for the numeral 1 display.

As previously indicated, fluid is supplied to the chamber 168 through an input pipe 169 and is permitted to vent through the channel 167 of the key 166. Substantially no pressure is applied to the input nozzle 182 of the element 183 under these circumstances. However, when the finger of the operator is placed in contact with the top of the key 166, the channel 167 is blocked. The channel 167 is large compared with channels 171–181 and pressure builds up very rapidly in the tank 168. This produces an increase in pressure in each of the associated control nozzles, for instance, the control nozzle 182, which causes all of the elements associated with the key 166, such as the element 183, to switch its stable state to that state which supplies fluid to the tubes 164. In consequence, the ten balls associated with flip-flops controlled by the key 166 are raised to their display position providing a numeral 1 display. The display is retained even after the finger of the operator is removed from the key 166 since each of the flip-flops, such as flip-flop 183, maintains a setting in accordance with the last signal provided thereto. In consequence, it is necessary to provide a reset signal for the element 183 and this signal is applied to the control nozzle 184. There are numerous ways in which such resetting may be accomplished and one method is illustrated in FIGURE 16. This particular type of resetting depends upon actuation of another key element; that is, a key element other than the element 166. It will be noted that the arrangement 186 is provided with an outlet tube 181' corresponding to the outlet channel 181 associated with the key element 166. When the key associated with the arrangement 186 is actuated; that is, the passage therethrough is blocked, the pressure in the associated chamber builds up and a signal is supplied from the outlet pipe 181' to the control nozzle 184 of the element 183 causing it to reset. This causes its associated ball to retreat to its unactuated or non-display position. It should be pointed out that the pipe 181' is connected to the control nozzle of each of the elements associated with the key 166 which are not associated with the number to be displayed by operation of the key associated with the system 186. For instance, if the number 2 is to be displayed by the system 186, then four of the balls actuated or raised to display position upon actuation of the key 166 are to be retained or may be retained in the display position for the numeral 2. Referring to FIGURE 11, these four balls are the uppermost center ball and the three centrally located bottom balls. Therefore, the pipe 181' need not be connected to the reset nozzle of the amplifier associated with these four balls but would be connected to each of the other six flip-flops of the system.

It is seen from the above description that the apparatus of the present invention may be employed to directly display numerals in accordance with the actuation of the elements of a standard keyboard. Of course, the elements 183 may be employed as storage elements for use in a digital system so that the numbers stored in the elements may be utilized at some subsequent time in a display by pneumatic elements arranged to sense the stored state of each of the flip-flops such as the flip-flop 183.

Referring now specifically to FIGURE 17 of the present invention, there is illustrated a mechanism for converting the apparatus of FIGURES 14, 15 and 16 into a character printing mechanism. The head element 156, 161, 164 of the FIGURE 14 is employed and bears the same reference numerals in FIGURE 17. In this embodiment of the invention, a sheet or strip of paper 192 is fed between the plate 161 and a fixed plate 193. The spacing between the face of the plate 161 adjacent face of the fixed plate 193 is quite small and is just sufficient to receive the thickness of paper 192. The balls 159 employed in this apparatus are fabricated from a pressed metallic powder having an ink material mixed initially with the powder so as to provide permanently inked balls. The pattern of balls to be raised to the uppermost position of the five-by-seven font arrangement employed in FIGURE 14, is selected and controlled in accordance with the apparatus of FIGURE 16 there being one key element 166 for each character to be displayed. In response to covering the aperture 167 in the key 166 of FIGURE 16, a pattern of balls 169 is raised to its uppermost position corresponding to the character to be printed. A relatively high pressure is employed in the system so that when the passage 167 is blocked the balls 159 are rapidly raised and impact against the paper driving an adjacent area of the paper into contact with the adjacent surface of the plate 193. As a result a dot of ink is applied to the paper at each area of impact of the balls 159 thereby causing to be displayed a pattern of dots indicative of the character selected by the particular selected key 166.

It is apparent that a conventional paper feed mechanism may be employed. Also a ribbon may be employed between the plate 161 and the paper 192 so that balls may be employed which are not self-inking. Conventional ribbon feed mechanisms may be employed. Other self-inking techniques than those described may be employed alternatively to the use of a ribbon or the self-inking balls 159 described in reference to this figure.

While I have described and illustrated several specific embodiments of my invention, it will be clear that variations of the details of construction which are specifically illustrated and described may be resorted to without departing from the true spirit and scope of the invention as defined in the appended claims.

What I claim is:

1. A display system comprising a plurality of pure fluid amplifiers each comprising at least two fluid output passages, an interaction region, means for issuing a main stream of fluid through said interaction region toward said fluid output passages, and control means for developing a variable pressure gradient across said main stream so as to switch the main stream of fluid between said output passages as a function of said pressure gradient, a display member having a plurality of display locations therein, a different vertically inclined fluid channel extending into the region of each display location, a small light-weight member located in each of said fluid channels for movement between a lower retracted position and an upper display position adjacent a display location of said display member, continuous fluid flow paths each connecting one of said output passages of each of said fluid amplifiers to a different one of said fluid channels so that, upon initiation of fluid flow to said one of said output passages of a fluid amplifier, its associated light-weight member is moved from its retracted to its display position, means for generating a fluid flow indicative of a symbol to be displayed and means for applying said last-mentioned fluid flow to said control means of fluid amplifiers associated with those of said light-weight members which when raised to their display positions are cumulatively indicative of the symbol to be displayed.

2. A display system comprising a plurality of pure fluid amplifiers each comprising at least two fluid output passages, an interaction region, means for issuing a main stream of fluid through said interaction region toward said fluid output passages, and control means for developing a variable pressure gradient across said main stream so as to switch the main stream of fluid between said output passages as a function of said pressure gradient, said amplifier being such that when the main stream of fluid is directed to one output passage the pressure in the other output passage is below ambient pressure, a display member having a plurality of display locations therein, a different fluid channel extending into the region of each display location, a small light-weight member located in and substantially blocking each of said fluid channels and movable between a retracted position and a display position adjacent a display location of said display member, fluid flow means connecting one of said output passages of each of said fluid amplifiers to a different one of said fluid channels so that upon initiation of fluid flow to said one of said output passages of a fluid amplifier its associated light-weight member is moved from its retracted to its display position, means for generating a fluid flow indicative of a symbol to be displayed and means for applying said last-mentioned fluid flow to said control means of fluid amplifiers associated with those of said light-weight members which when raised to their display positions are cumulatively indicative of the symbol to be displayed.

3. The combination according to claim 2 wherein said display locations are arranged in a predetermined font, a platen parallel to and closely adjacent a plane defined by said display locations of said display member, and means for constraining said light-weight members to prevent them from escaping from said fluid channels, said means for constraining permitting said light-weight members to contact said platen.

4. The combination according to claim 3 wherein said light-weight means are spheres weighing only four grams and said fluid channels are inclined upwardly toward said display locations.

5. The combination according to claim 2 wherein said light-weight means are spheres weighing only four grams and said fluid channels are inclined upwardly toward said display locations.

6. A display member comprising a pure fluid amplifier comprising at least two fluid output passages, an interaction region, means for issuing a main stream of fluid through said interaction region toward said fluid outlet passages, control means for developing a variable pressure gradient across said main stream so as to switch the main stream of fluid between said output passages as a function of said pressure gradient, said amplifier being such that when the main stream of fluid is directed to an output passage, the pressure in the other output passage is below ambient pressure, a display member having a display region therein, a fluid flow channel extending between one of said output passages and said display location, a light-weight member located in said fluid flow channel for movement between a retracted position and a display position adjacent said display region so that upon initiation of fluid flow to said one of said output passages said light-weight member is moved from its retracted to its display position, and means for applying a display control fluid flow signal to said control means for directing said stream of fluid to said one output channel.

7. The combination according to claim 4 wherein is further provided inking means for said spheres and porous means interposed between said spheres and said plate whereby printing is effected on said porous means when said spheres are selectively moved to said display position.

8. The combination according to claim 7, wherein said spheres are pressed powder and said inking means comprises ink material mixed in said powder.

References Cited by the Examiner
UNITED STATES PATENTS

| | | | |
|---|---|---|---|
| 1,049,240 | 12/1912 | Janecek | 40—28 |
| 1,782,328 | 11/1930 | Wearham | 40—106 |
| 2,145,747 | 1/1939 | Askew | 40—106 |
| 2,174,446 | 9/1939 | Otis | 40—106 |
| 2,645,048 | 7/1953 | Adams | 40—130 |
| 2,672,889 | 3/1954 | Swanson | 40—28 |
| 2,703,547 | 3/1955 | Hardesty | 116—129 |
| 2,916,205 | 12/1959 | Litz | 235—61 |
| 3,001,698 | 9/1961 | Warren | 235—61 |
| 3,003,694 | 10/1961 | Oxley | 235—61 |
| 3,005,533 | 10/1961 | Wadey | 235—61 |
| 3,010,649 | 11/1961 | Glattli | 235—61 |
| 3,034,628 | 5/1962 | Wadey | 235—61 |
| 3,122,039 | 2/1964 | Sowers | 235—61 |
| 3,128,040 | 4/1964 | Norwood | 235—201 |

LEO SMILOW, *Primary Examiner.*